Figure 1:
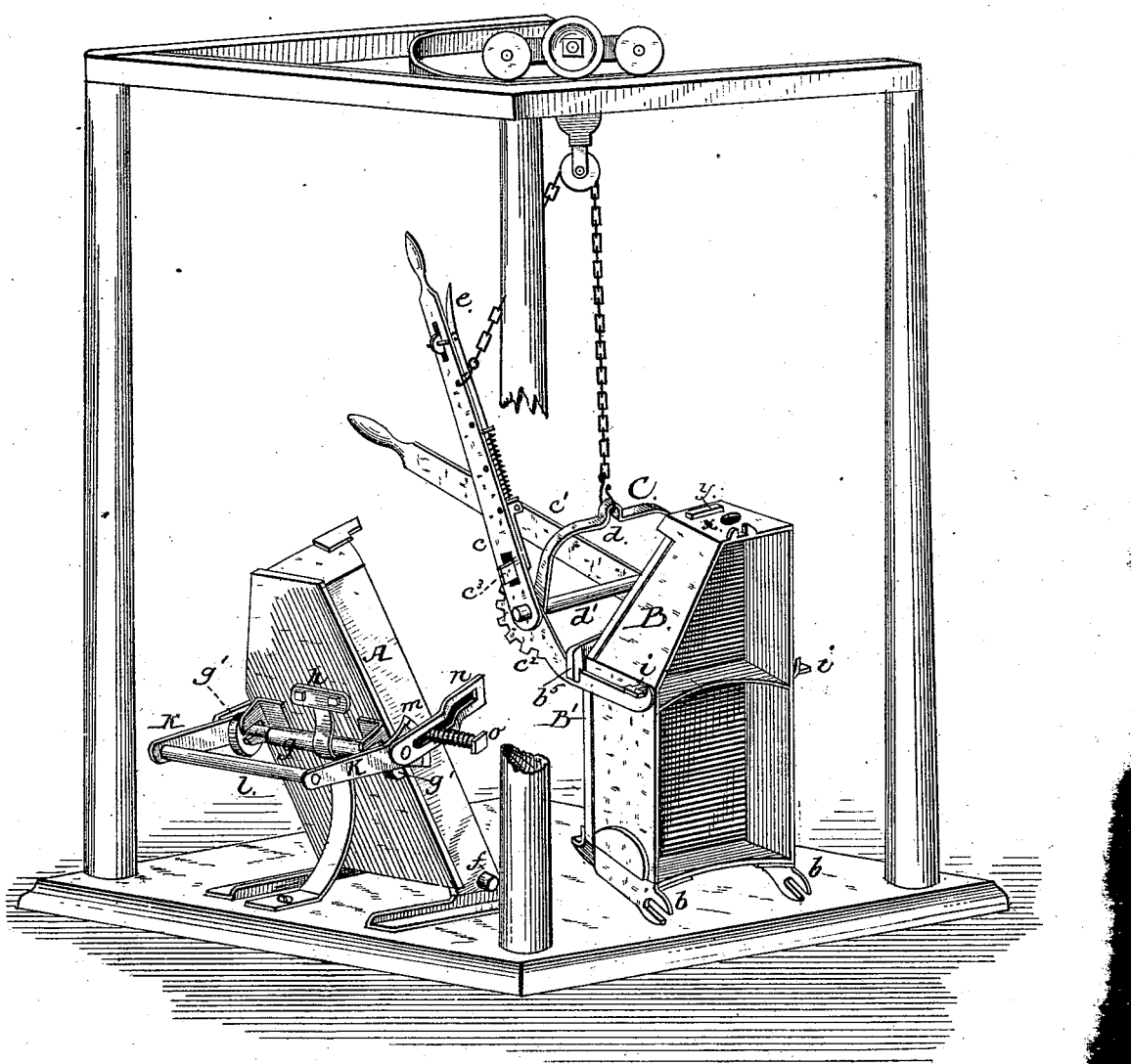

(Model.)

2 Sheets—Sheet 1.

G. E. SMITH.
Clamping Device for Molders' Flasks.

No. 236,462.                     Patented Jan. 11, 1881.

Witnesses:
J. Walter Fowler,
A. H. Evans

Inventor:
George E. Smith (Model.)  2 Sheets—Sheet 2.
G. E. SMITH.
Clamping Device for Molders' Flasks.
No. 236,462.  Patented Jan. 11, 1881.
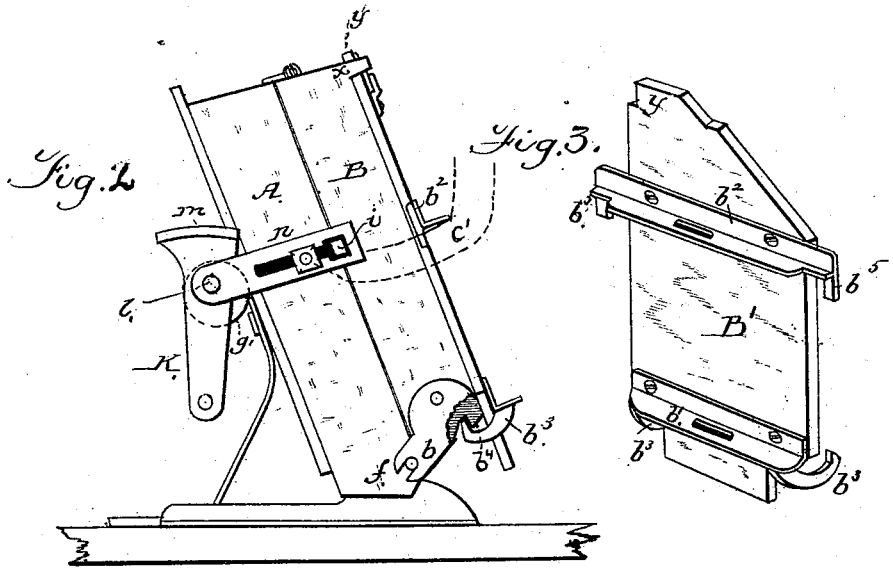
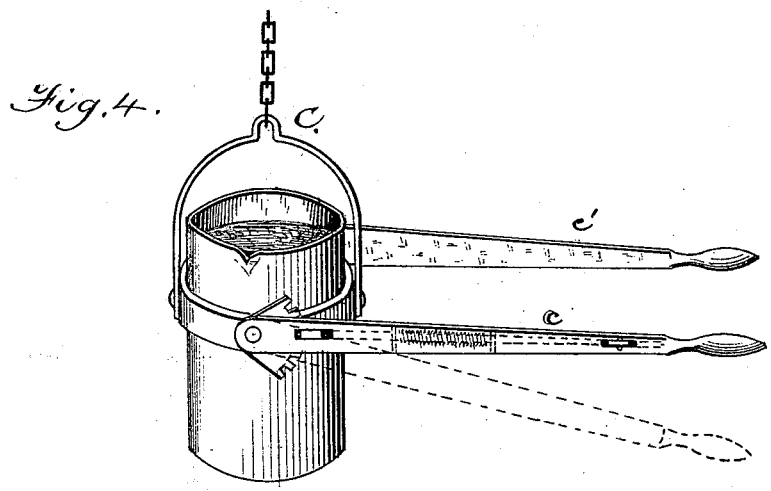
Witnesses:
F. Walter Fowler,
A. H. Evans
Inventor:
George E. Smith

UNITED STATES PATENT OFFICE.

GEORGE E. SMITH, OF RACINE, WISCONSIN, ASSIGNOR OF FOUR-FIFTHS TO WM. S. BUFFHAM AND THOMAS DICKENSON, OF SAME PLACE.

CLAMPING DEVICE FOR MOLDERS' FLASKS.

SPECIFICATION forming part of Letters Patent No. 236,462, dated January 11, 1881.

Application filed December 1, 1880. (Model.)

*To all whom it may concern:*

Be it known that I, GEORGE E. SMITH, of Racine, State of Wisconsin, have invented a new and useful Improvement in Molders' Flask-Clamping Devices; and I do hereby declare that the following description, taken in connection with the accompanying drawings, is an accurate description thereof.

The object of my invention is to furnish a convenient mode of handling flask-copes in the foundry and clamping them to a stationary drag or chill-block.

The particular features of the apparatus which I regard as new will be hereinafter pointed out in the claims.

Figure 1 is a perspective view, showing the tongs, flask-cope, chill-block, block-clamp, and the overhead traveler or car. Fig. 2 shows the flask-cope clamped to chill-block, a part of the tongs in dotted lines. Fig. 3 is the back board, with cleats and self-locking projections. Fig. 4 shows a modification of the tongs used for carrying a ladle of iron.

In the drawings, A is the chill-block or drag, which is located in any part of the foundry convenient for pouring metal. An overhead railway or track leads from the various molding-floors to the chill-block.

B is the flask-cope, of usual form. At bottom of flask-cope are ears $b$, slotted at the ends to form the female portion of the chill-block hinge.

B' is the back board of the flask. Near the lower end of this board there is a cleat, $b'$, carrying two curved hooks, $b^3$, which, when the board is in place, engage projections $b^4$ on lower end of the flask-cope, the upper end, $y$, of the board passing through a mortise, $x$, at the top of the flask, as shown. A cleat, $b^2$, extends across the board near the middle, and has downward projections outside the board edges at $b^5$, as shown. Holes in these cleats make convenient handles. When the back board is in place its lower end extends below the flask, even with the ears $b$, so the cope will stand on end without support.

C indicates a tongs for hoisting and handling the flask, which also serves as a clamp to hold the back board firmly in position on the flask. The tongs are suspended to a sheave attached to the car overhead by a chain attached to the bail $d$ at one end and to the handle $c$ of the tongs at the other. The handle $c'$ is firmly secured to the cross-bar $d'$, and terminates in a hooked jaw at the front. The other handle, $c$, turns on the cross-bar $d'$ as a pivot. The sector-plate $c^2$ is rigidly secured to the bar $d'$, and terminates in a jaw similar to that of $c'$. The bail $d$ is preferably rigid with the cross-bar and the two jaws. On the handle $c$ there is a spring-pawl, $c^3$, which springs into notches in sector-plate, and is withdrawn by pressing the bell-crank lever $e$ near hand-hold. The jaws of handle $c'$ and plate $c^2$ have inclined projections, which engage back of cleat $b^2$ of back board and lugs $i$ at flask-joint, and when flask is hoisted its weight tends to wedge or clamp the whole firmly together between these inclines.

The flask is raised from the ground by passing the tong-jaws under projections $i$, at the sides of the flask, and bearing down with one hand upon handle $c$, while grasping handle $c'$ with the other. The handle $c$ thus draws upon the chain, which, passing over the sheave, lifts the bail. When the flask has been lifted high enough for convenient handling the pawl $c^3$ is released and takes into one of the notches in sector-plate $c^2$, thus holding the weight of flask, and by pushing on the handles the car is moved along until the flask is in position in front of chill-block. The chill-block has ears or trunnions $f$ near the bottom, which form the male portion of the flask-hinge. When the flask-cope is brought in front of the chill-block the ears $b$ are slipped upon the trunnions $f$ and the flask turned over upon the block.

To the back of the chill block there is attached a clamping device constructed as follows: A cross-bar, $g$, is journaled in suitable open bearings at the back of the block, and has a cam or eccentric, $g'$, at each end. The bar $g$ is held toward the block by a spring, $h$. Levers K K are secured to the bar $g$, and are connected at their outer ends by a cross-bar, $l$, which serves as a handle. The levers K K terminate at their inner ends in wedges $m$, which are thinnest at the bottom edges, and pass between draw-bars $n$ and the sides of the block. The draw-bars $n$ are slotted and pressed toward the block by springs on the pins o, which pass through the slots into the sides of chill-block. When the handle l is raised the wedges m spread the bars n sidewise, so that the projections i on the flask will pass between them. The levers K K are then depressed, permitting the draw-bars to close sidewise, so that the slots embrace projections i as wedges m are raised. A farther depression of the levers operates cams $g'$ in such a manner that the draw-bars are drawn with great force.

As the draw-bars and the jaws of tongs C both embrace the projections i on the flask, I have thus a continuous clamp from the back of the chill-block to the back of flask-board, and all firmly held together while the metal is being poured.

What I claim as new, and desire to secure by Letters Patent, is—

1. The back board B', secured to flask-cope B by means of a mortise at the top and curved hooks extending under suitable projections at the bottom end of flask, as set forth.

2. The hoisting-tongs described, consisting of the jaws, rigid handle and pivoted handle, and the chain extending from the rigid portion over a sheave to the pivoted handle, as shown.

3. The combination, with the jaws, of the notched sector-plate $c^2$, pivoted handle and spring-pawl, and the chain extending from the rigid portion over a sheave to the pivoted handle, as set forth.

4. The combination of the tongs, rigid jaws, and offsets or inclines, as described, with the flask-cope having projections i, and back board having projecting cleat $b^2$, all connected and operated as shown and described.

5. The levers K, connected to the chill-block, as shown, having wedge-plates m, combined with the draw-bars n and spring on pin o, for the purpose of operating the draw-bars sidewise, as set forth.

6. The cam-levers $g'$ K, having cross-bar l, secured in the open bearings of the chill-block by spring h, combined with the draw-bars, and the flask-cope, having projections i, as set forth.

7. The clamping device described, consisting of the cam-levers $g'$ K, connected by cross-bar l, the wedges m, the slotted draw-bars n on the pins o, and the spring on the pin o, all secured to the chill-block and operated on the pins i on the flask-cope, in the manner and for the purpose set forth.

8. The combination, with the projections i on the cope, of the draw-bars operated by cam-levers on the chill-block, and the tongs clasping said projections and having offsets behind cleats of the back board, whereby the back board, cope, and chill-block are firmly held together by a continuous clamp, all in the manner and for the purpose hereinbefore set forth.

GEORGE E. SMITH.

Witnesses:
W. A. BARTLETT,
D. B. GALLATIN.